(12) United States Patent
Smith et al.

(10) Patent No.: US 6,893,028 B2
(45) Date of Patent: May 17, 2005

(54) PERSONAL MOTORIZED VEHICLE TANDEM APPARATUS

(75) Inventors: Charles Marshall Smith, 1019 S. Grace St., Lombard, IL (US) 60148; John Charles Smith, 340 Oak St., Glen Ellyn, IL (US) 60137

(73) Assignees: Charles Marshall Smith, Lombard, IL (US); John Charles Smith, Glen Ellyn, IL (US)

( * ) Notice: Subject to any disclaimer, the term of this patent is extended or adjusted under 35 U.S.C. 154(b) by 0 days.

(21) Appl. No.: 09/962,296

(22) Filed: Sep. 26, 2001

(65) Prior Publication Data

US 2003/0057751 A1 Mar. 27, 2003

(51) Int. Cl.[7] .......................... B62D 63/06; B62D 39/00
(52) U.S. Cl. ................. 280/32.7; 280/33.993; 280/204; 297/243; 297/241; 297/217.6
(58) Field of Search ................. 280/204, 32.7, 280/33.993, 63; 297/243, 217.7, 240, 241

(56) References Cited

U.S. PATENT DOCUMENTS

| | | | | |
|---|---|---|---|---|
| 3,387,859 A | * | 6/1968 | McClellan | 280/204 X |
| 4,546,992 A | * | 10/1985 | Swartz et al. | 280/282 |
| 5,064,209 A | * | 11/1991 | Kurschat | 280/204 X |
| 5,564,721 A | * | 10/1996 | Wians | 280/32.7 |
| 5,769,440 A | * | 6/1998 | Jones | 280/204 |
| 5,813,679 A | * | 9/1998 | Hobrath | 280/32.7 |
| 6,312,003 B1 | * | 11/2001 | Liu | 280/204 |
| 6,464,238 B2 | * | 10/2002 | Reiland et al. | 280/33.993 X |
| 6,575,480 B2 | * | 6/2003 | McKelvey | 280/33.993 X |

* cited by examiner

Primary Examiner—Anthony D. Barfield
(74) Attorney, Agent, or Firm—McAndrews, Held & Malloy, Ltd.

(57) ABSTRACT

The Dude Tandem has been developed to assist a companion of a person in a motorized wheelchair or scooter to travel with them at the rear of their vehicle on a seat. It will relieve the companion of any discomfort or fatigue from walking and trying to keep up. The Dude Tandem is a new device, which has been welcomed by the public as a much needed convenience.

3 Claims, 9 Drawing Sheets

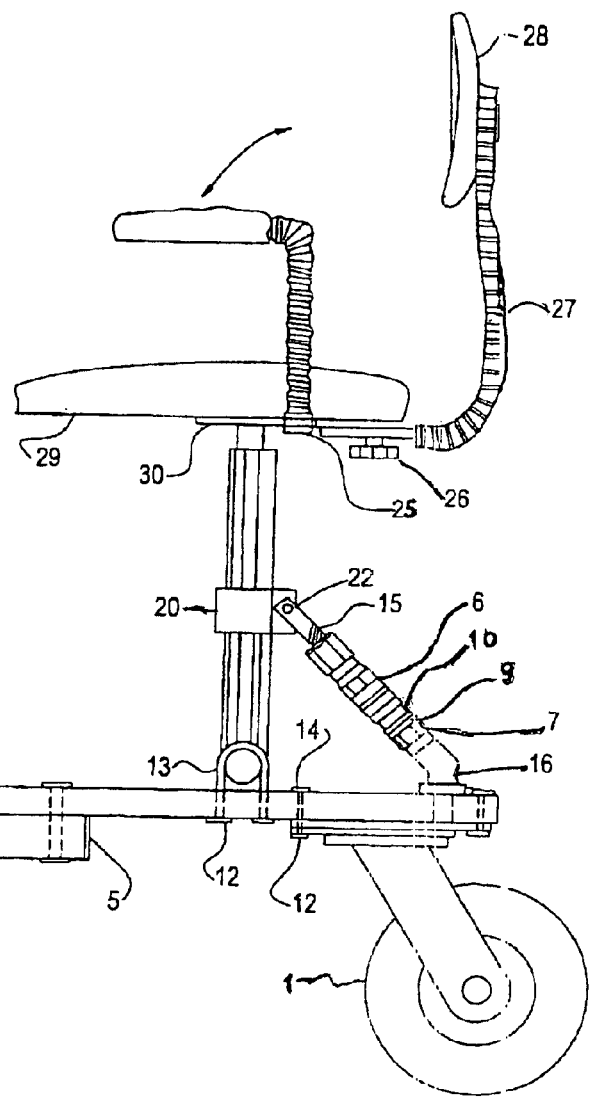
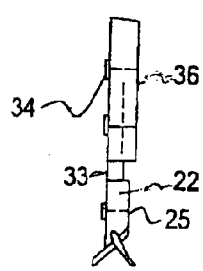
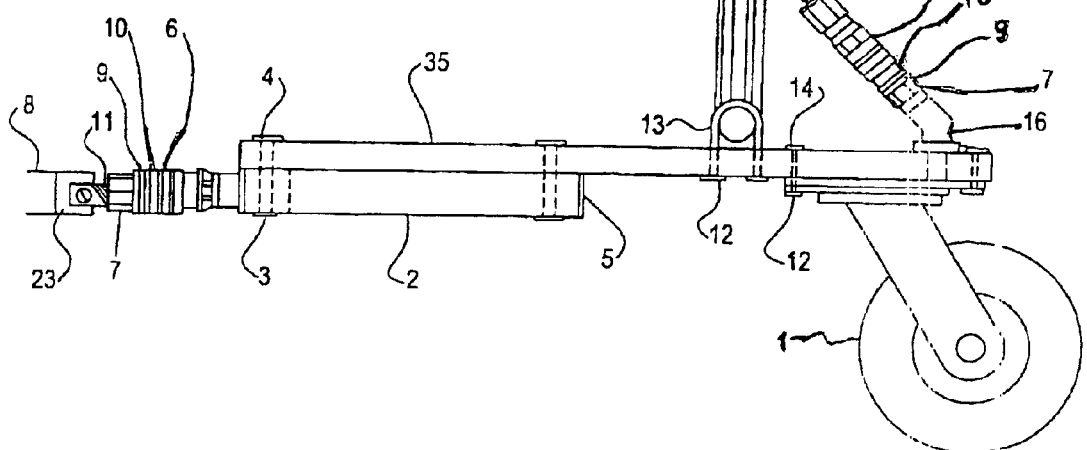
FIG. 1
FIG. 2

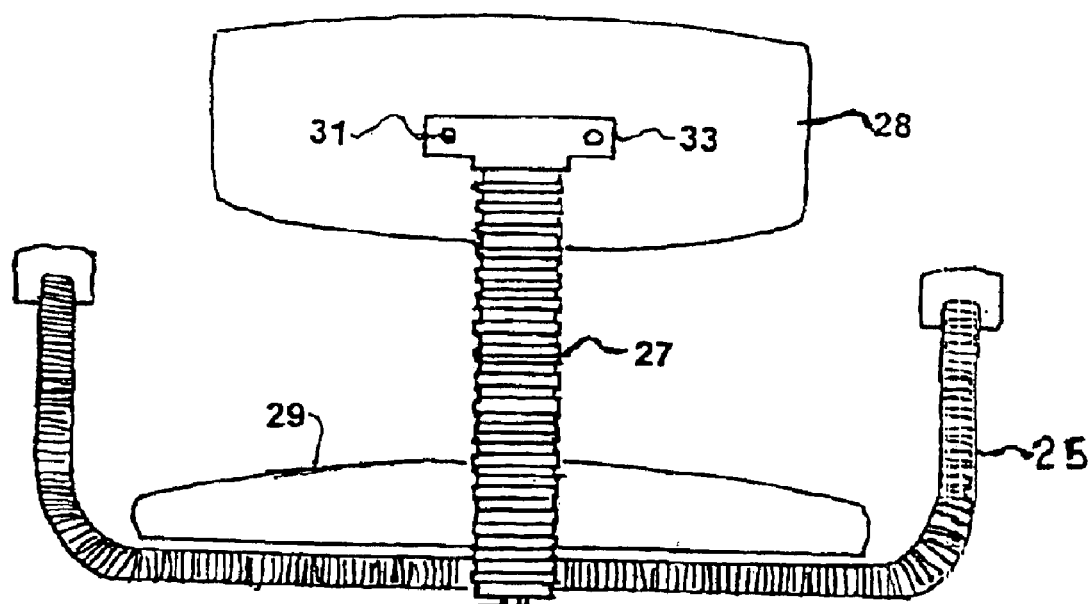
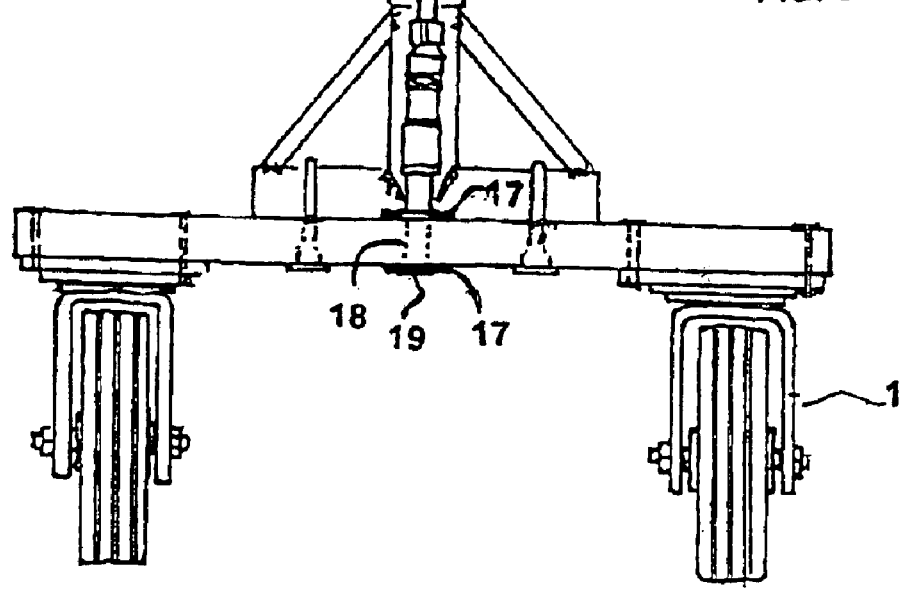
FIG. 3

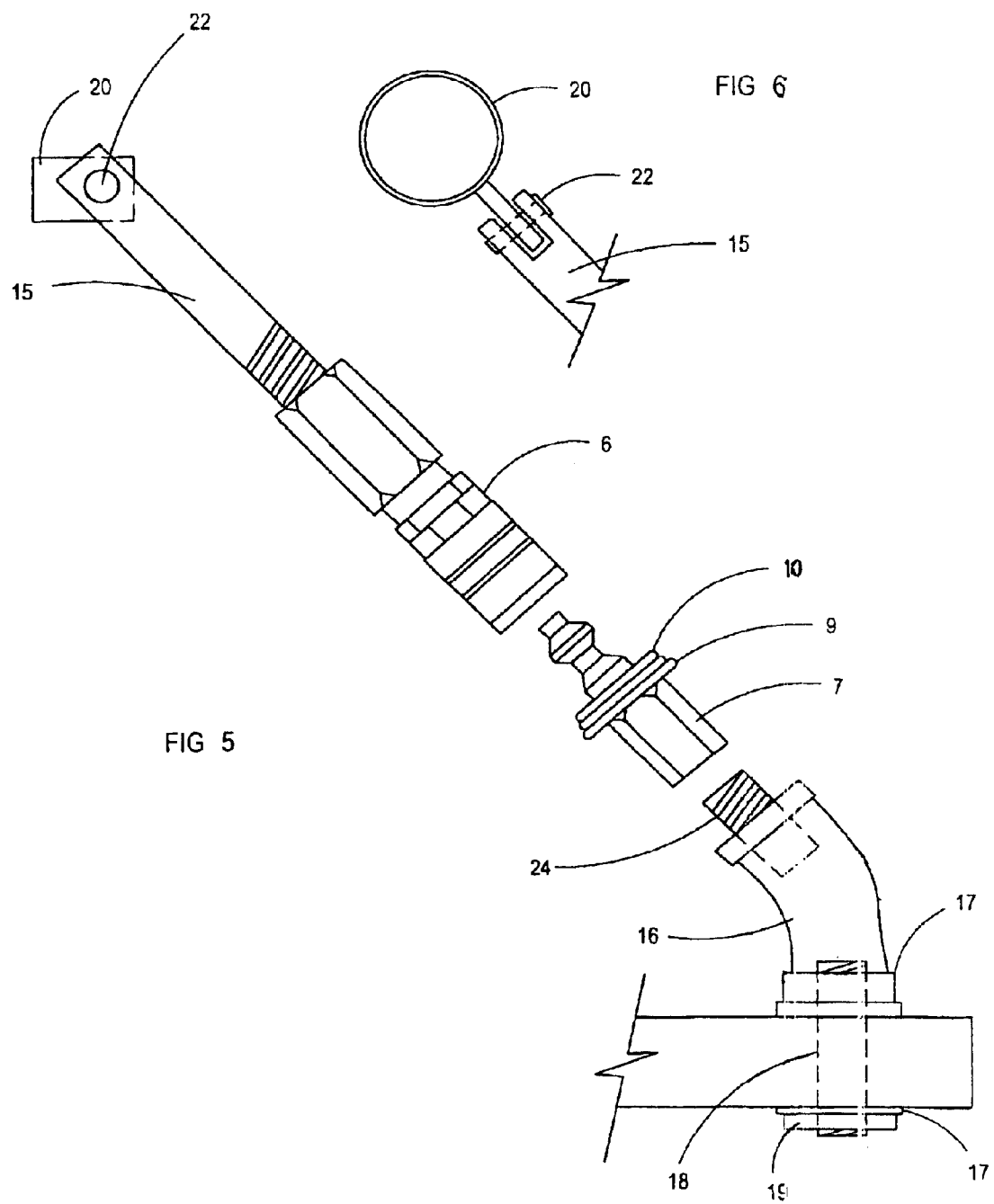

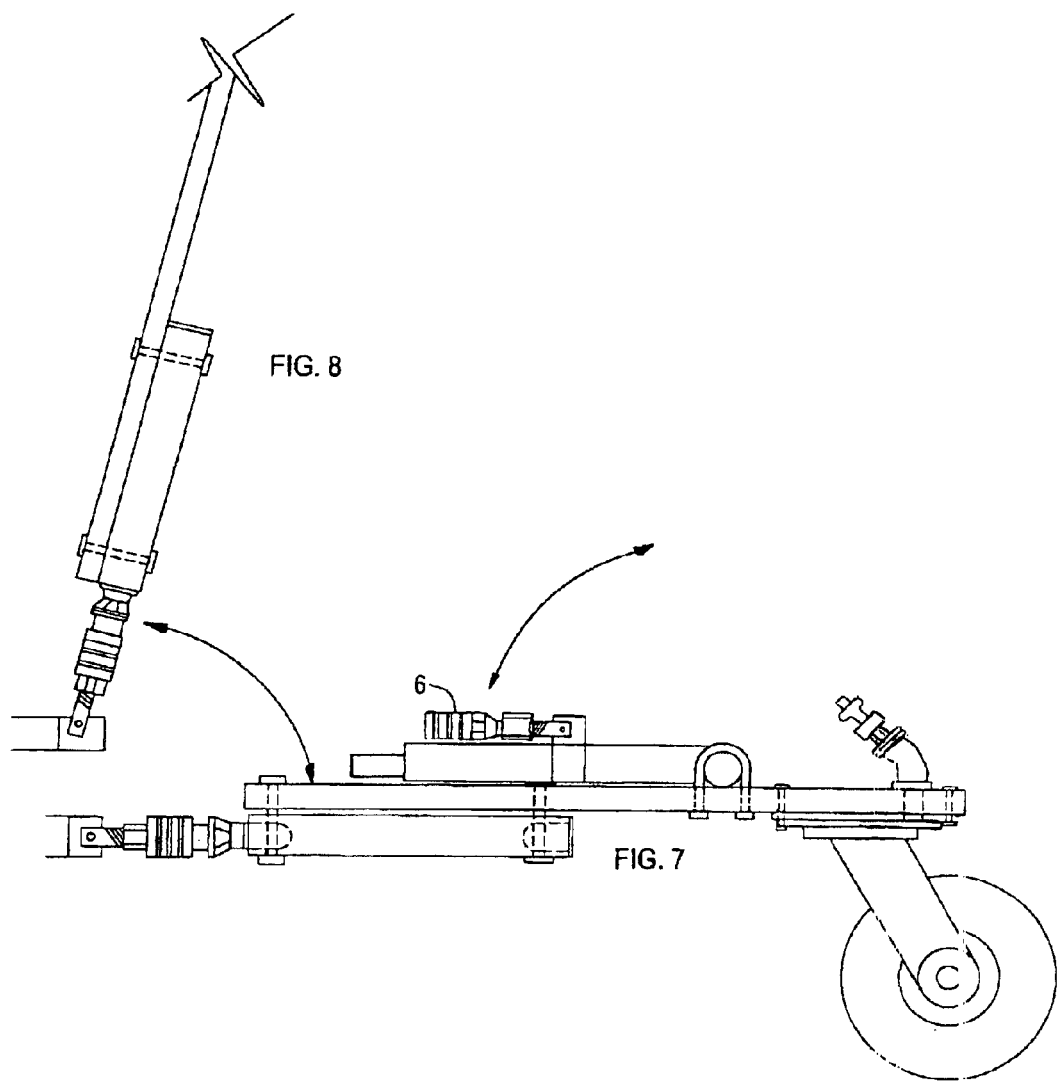

TANDEM PARTS LIST

| Part Number | Description | Quantity |
|---|---|---|
| 1 | Swivel caster 6" wheel assembly | 2 |
| 2 | Tow tube ¾" ID x 8 ½" long EMT electrical conduit | 2 |
| 3 | Weld nuts curved flange up | 4 |
| 4 | Joint connector bolt ¼" 20 x 1" (flat bolt) | 4 |
| 5 | Plug ½" IPT | 2 |
| 6 | Coupler ¼" x ¼" FIPT | 3 |
| 7 | Coupler plug ¼" x ¼" FIPT | 3 |
| 8 | Pipe hanger clamp ½" with ¼" bolt hole | 2 |
| 9 | Flat washer ½" ID 1"OD | 3 |
| 10 | Rubber grommet ½" ID x ¾" OD 3/16" thick | 3 |
| 11 | Clevis nipple ¼" IPT one end, clevis other end | 2 |
| 12 | Joint connector nut ¼" 20 x ½" (flat nut) | 12 |
| 13 | U bolt ID 1 1/8" IL 1 5/8" with mounting plate | 2 |
| 14 | Joint connector bolt ¼" 20 x ¾" (flat bolt) | 8 |
| 15 | Clevis nipple ¼" IPT one end, clevis other end | 1 |
| 16 | Coupling ¼" 45° IP | 1 |
| 17 | Flat washer ½" ID x 1 ¼" OD | 2 |
| 18 | Pipe nipple ¼" x 1 ½" running thread | 1 |
| 19 | Lock nut ¼" IPT | 1 |
| 20 | Pipe clamp 1" with ¼" bolt hole | 1 |
| 21 | Seat shaft assembly | 1 |
| 22 | Roll pin ¼" diameter x 5/8" long | 3 |
| 23 | Screw ¼" 20 x ¾" with lock nut | 2 |
| 24 | Pipe nipple ¼" x 1" | 1 |
| 25 | Seat plate and armrest assembly with bellows | 1 |
| 26 | Knob with flat and lock washers | 1 |
| 27 | Back frame with bellows | 1 |
| 28 | Back cushion | 1 |
| 29 | Seat cushion | 1 |
| 30 | Screw with flat washer | 4 |
| 31 | Screw with flat washer | 2 |
| 32 | Back plate | 1 |
| 33 | Square steel tube ½" x ½" x 6" | 1 |
| 34 | Screws Number 8 x 1" sheet metal flat head | 4 |
| 35 | Deck | 1 |
| 36 | Hardwood armrest 1" thick x 2" wide x 6 ½" long | 2 |

FIG 11

LIST OF MANUFACTURED PARTS

| Suppliers/Manufacturers | Part Number | Description |
|---|---|---|
| Stayfast Products, Inc.<br>505 Lake Shore Blvd.<br>Painesville, OH 44077 | JCN142012HDT<br>BB142025UHD<br>R14205CFU<br><br>BA142035UHDT | ¼-20x.472 long joint connector nut<br>¼-2x.934 long joint connector bolt<br>¼-20x5/16" long barrel weld nuts round base curved flange up<br>¼-20x1.378 long joint connector bolt |
| Faultless Caster Division<br>Evansville, IN 47711 | 367P29K150rZPF | 6" swivel casters |
| Campbell Hausfeld<br>PO Box 12898<br>Cincinnati, OH 45212 | MP3335<br>MP2117 | Coupler ¼" FNPT push to connect<br>¼" FNPT |
| Office Star Products<br>2883 Surveyor St.<br>Pomona, CA 91768 | 150/SC | Office task chair less base & casters, less armrest. |
| McMaster-Carr Supply Co.<br>600 County Line Rd.<br>Elmhurst, IL 60126-2081 | | All other parts and hardware supplies. |

FIG 12

PERSONAL MOTORIZED VEHICLE TANDEM APPARATUS

CROSS-REFERENCE TO RELATED APPLICATIONS

Not Applicable.

STATEMENT REGARDING FEDERALLY SPONSORED RESEARCH OR DEVELOPEMENT

Not Applicable.

REFERENCE TO MICROFICHE APPENDIX not applicable.

BACKGROUND OF THE INVENTION

My wife has a battery-powered scooter, I would walk with her and before long I would get lower back pain and become fatigued. The Dude Tandem was the answer to my problem. Now with my Dude Tandem attached to the rear of her scooter my problems are in order.

We have made an extensive patent search at the Chicago Public Library and on the Internet and could not find any references to the Dude Tandem.

BRIEF SUMMARY OF THE INVENTION

The Dude Tandem is a chair mounted on a deck with two six-inch swivel casters mounted at the back. The deck is connected to the rear bumper of a motorized scooter or wheelchair to carry a companion. Speaking with many people they say there is a definite need for the Dude Tandem. One in particular, a man said his wife had a scooter but she was afraid to operate it. He would purchase one so he could operate the scooter and she could ride on the Dude Tandem.

BRIEF DESCRIPTION OF THE DRAWINGS

FIG. 1 is a side elevation view of the present personal motorized vehicle tandem apparatus.

FIG. 2 is a side elevation view of a portion of the tandem apparatus illustrated in FIG. 1, showing the arm rest portion of the apparatus.

FIG. 3 is a rear elevation view of the tandem apparatus illustrated in FIG. 1.

FIG. 5 is an exploded side elevation view of the seat shaft support portion of the tandem apparatus illustrated in FIGS. 1 and 3.

FIG. 6 is a transverse side view of the seat plate assembly portion of the tandem apparatus illustrated in FIGS. 1 and 3.

FIG. 7 is a side elevation view of a portion of the tandem apparatus illustrated in FIGS. 1 and 3, showing the configuration of the apparatus with its seat shaft support and seat removed.

FIG. 8 is a side elevation view of a portion of the tandem apparatus illustrated in FIG. 7, showing the configuration of the apparatus with its deck in a raised position and almost in a vertical, stowed position.

FIG. 11 is a part list for the tandem apparatus illustrate in FIGS. 1–10.

FIG. 12 is a listing of the part supplier for the tandem apparatus illustrated in FIGS. 1–10.

DETAILED DESCRIPTION OF THE INVENTION

We designed three prototype units and tested them extensively. The first two exposed safety hazards and some discomforts, which we were able to overcome. The third prototype is the one we will use as our production model.

Deck

Figure 4:
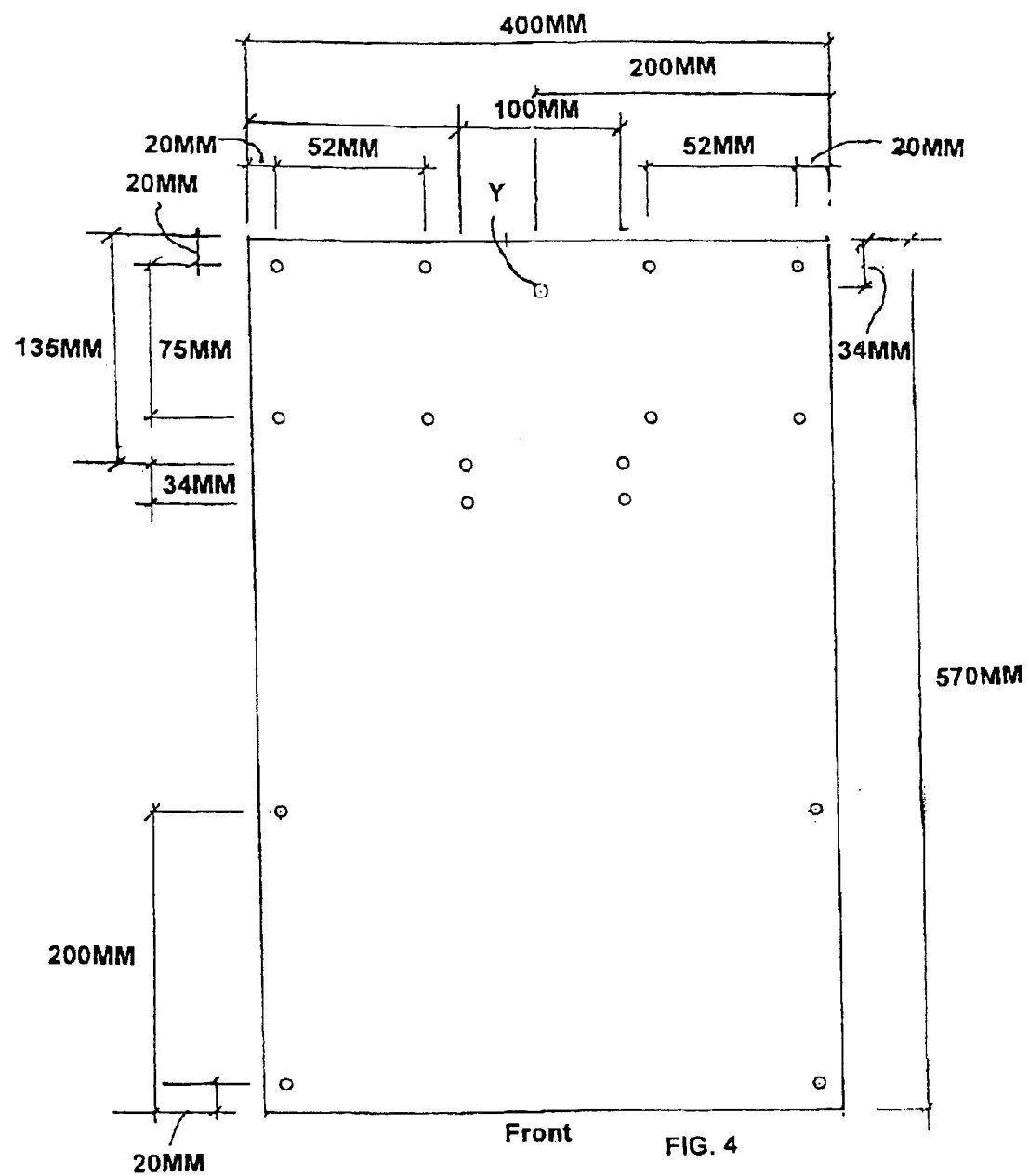
FIG. 4 is a top plan view of the deck portion of the tandem apparatus illustrated in FIGS. 1 and 3, showing the location of the seventeen holes formed in the deck, as well as the dimensions of the deck.
Figure 9:
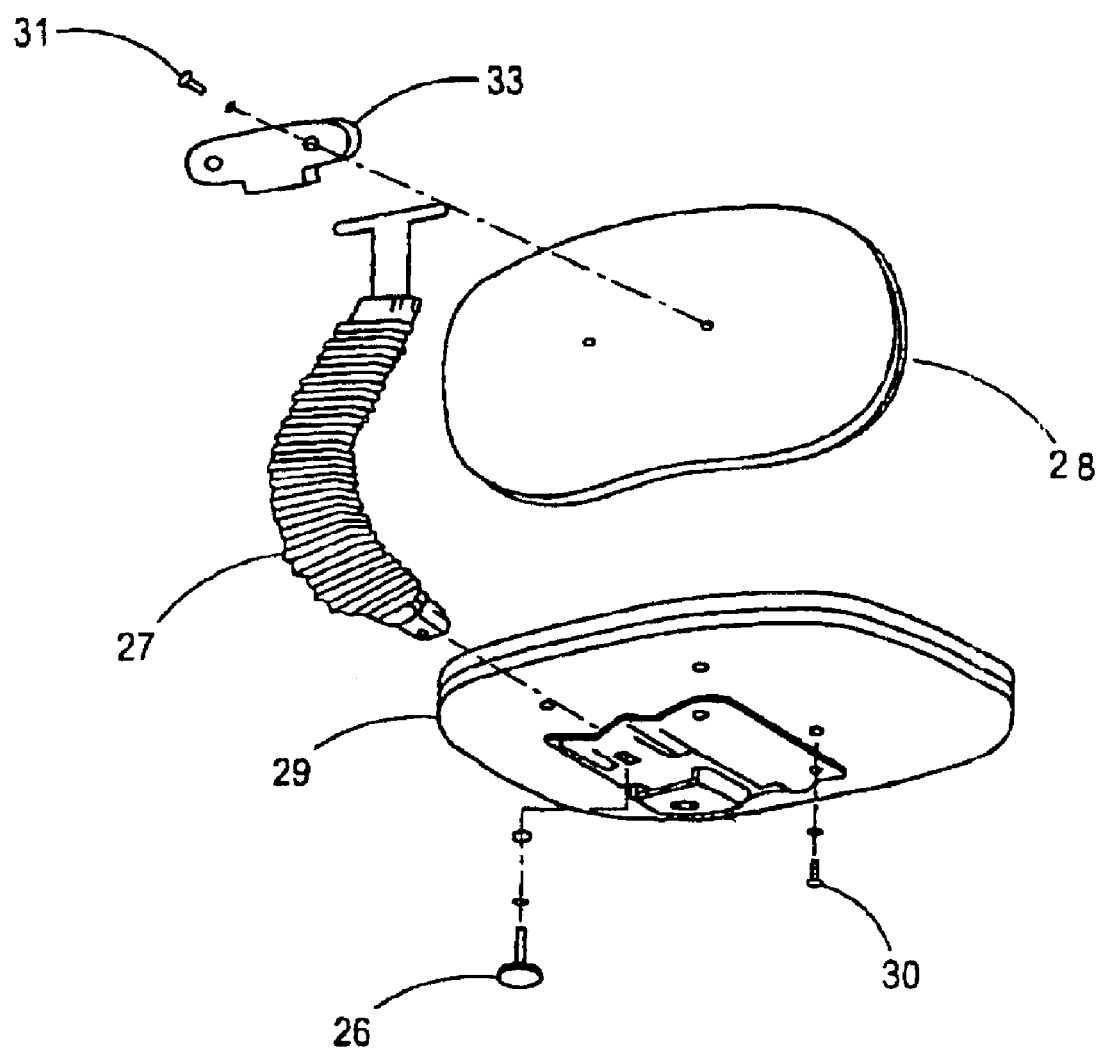
FIG. 9 is an exploded perspective view taken from the bottom of the tandem apparatus, showing the manner in which the seat portion is assembled.
Figure 10:
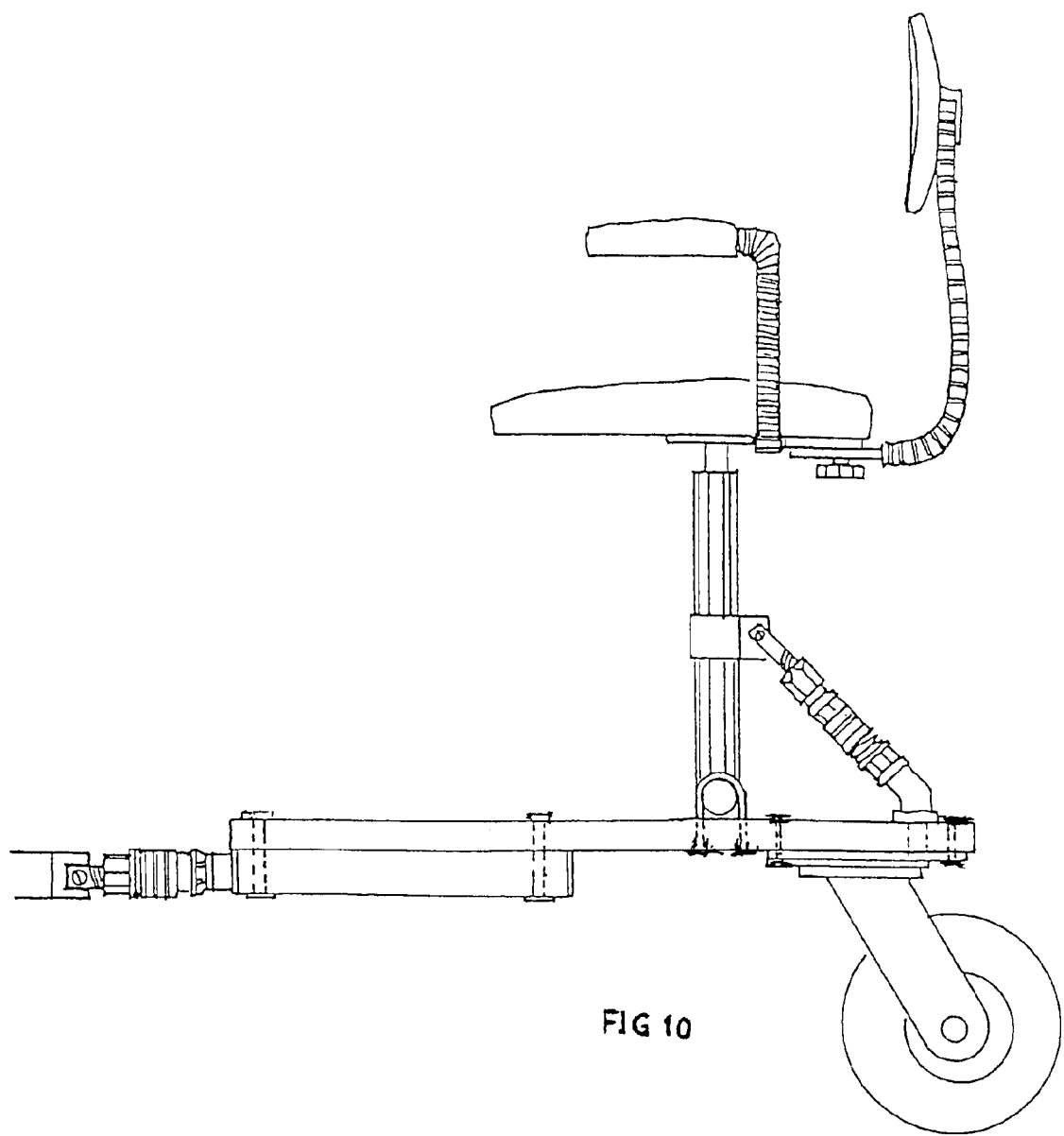
FIG. 10 is a side elevation view of the tandem apparatus, showing the same view as that shown in FIG. 1, but with the reference numerals omitted.

The Deck 35 shown in FIG. 4 has sixteen 9 mm diameter holes and one 11 mm diameter hole.

Four holes in each rear corner for the two swivel casters part number 1 fastened with four parts number 4 and 12 (bolts & nuts).

Four holes in the center just forward of the caster holes are for two U bolts part number 13 to fasten the seat shaft assembly with mounting plate and nuts.

Four holes at the front of the deck (two on each side) are for the two tow tubes, one of which is shown in FIG. 1 as tow tube 2. The tow tubes are made from ¾" EMT electrical conduit 222 mm long with a ¼" body universal coupler hex end pressed into one end of the tube and a ½" IPT plug threaded flush to the other end. Two 9 mm holes drilled 10 mm from each end to fasten the tube to the deck with two part number 3 curved weld nuts round base curved flange up to conform to the outside circumference of the OD of the tube along with two joint connector bolts.

Seat Shaft Assembly

The seat shaft assembly 21 shown in FIG. 3 is reworked with a piece of 1" EMT electrical conduit 150 mm long as the base. There is a groove rolled in 25 mm from each end 0.5 mm deep using a tubing cutter with a restrictor roller wheel in place of the cutter wheel. The grooves are to allow the two U bolts to fit over the tubes and to hold the assembly centered. The seat shaft is cut at the bottom with a 1 {fraction (3/16)}" diameter metal hole saw centered ½" from the bottom. The hole is open at the bottom to be set over the tube centered and welded in place. Two gussets, one on each side of the shaft made from ½".times.½" square steel tube cut at 45.degree. on each end welded to the ends of the base tube and to the shaft below the 1" clamp part number 20. The clamp is welded in place 105 mm from the bottom of the shaft assembly to the bottom of the clamp with the tabs clamped together and facing the rear.

DETAILED DESCRIPTION OF THE INVENTION (CONTINUED)

Seat Shaft Support

The seat shaft support sheet 1/9 is made up of part number 15, clevis nipple ¼" IP×60 mm long. Threaded one end with a clevis cut 3 mm wide×20 mm deep on the other end. A ¼" diameter hole drilled at right angle to the clevis centered 9 mm from the end. The clevis straddles the tab on the clamp and is held in place with a ½" diameter×⅝" long roll pin pressed through the holes in the clevis and the clamp tabs. The treaded end is screwed into part number 6 coupler. The parts 15 and 16 have a total length of 105 mm, which can be adjusted by screwing them together or apart. Part number 24, ¼" IP×38 mm long running thread connects part number 7 coupler plug to part number 16 a 45° ¼" IP coupling. The other end of the coupling is connected to the deck through hole Y tapped to ¼" IP. With a ¼" IP nipple running tread×45 mm long. Two ½" IP×1⅜" OD flat washers, one on top of the deck and one on the bottom of the deck tightened with a ¼" IPT locknut. The Y hole is threaded so the nipple fits tight in the hole without having any lateral motion.

Seat Plate

The seat plate part number 25 was reworked with the armrest tube ½" EMT electrical conduit 32" long. A 10" stub bent up on each end, centered on and welded to the bottom of the plate just behind the seat shaft hole. The armrest part number 36 is oak hardwood, 1" thick×2" wide×6½" long. A slot is cut in the center bottom ½" wide×½" deep full length to accept the ½"×½" steel tube part number 33. The tube has a ¼" diameter hole drilled at one end centered ¼" from the back end. The stub ends of the ½" thin wall tube are slotted to ½" wide and ½" deep with a ¼" diameter hole 5 mm from the top and 5 mm from the back to accept the ½" square tube and fasten with part number 22 roll pin. The bellows 1¼" diameter×1" long sump pump corrugated black plastic hose. A plastic plug is fitted to one end with a ½"×½" square hole in the center to fit over the ½"×½" steel tube.

Parts Lists

Sheet 8/9 is a list of our part numbers and sheet 9/9 is a list of suppliers/manuafactures and their part numbers.

What is claimed is:

1. A tandem apparatus that attaches as a towed unit to a personal motorized vehicle, the tandem apparatus comprising:

(a) a deck, defining a planar surface, with a front portion and a rear portion and an operating position that is substantially parallel to a ground surface;

(b) a pair of spaced apart swivel caster wheels extending vertically downwardly from said deck rear portion when said desk is in said operating position;

(c) a pair of detachable pivotable connectors extending between said motorized vehicle and said front portion of said deck, each of said connectors (1) restricting movement in a lateral direction, (2) allowing limited movement in a downward direction to accommodate ground surface fluctuations, and (3) allowing movement in an upward direction to permit rotation of said deck to a substantially vertical stowed position, whereby said pair of swivel caster wheels imparts torsional stability to said deck such that, upon lateral movement of said pivotable connectors by turning of the motorized vehicle, rotation of the deck about its longitudinal axis is inhibited.

2. The tandem apparatus of claim 1, further comprising:

(d) a collapsible chair secured to said deck, said collapsible chair extending in an upward direction from said deck, said collapsible chair extending in an upward direction from said deck when said deck is in said operating position.

3. The tandem apparatus of claim 2, wherein said collapsible chair has a seat removably secured thereto.

* * * * *